US010149047B2

(12) United States Patent
Geiger et al.

(10) Patent No.: US 10,149,047 B2
(45) Date of Patent: Dec. 4, 2018

(54) MULTI-AURAL MMSE ANALYSIS TECHNIQUES FOR CLARIFYING AUDIO SIGNALS

(71) Applicant: Cirrus Logic Inc.

(72) Inventors: Fredrick D. Geiger, Sandy, UT (US); Bryant V. Bunderson, Sandy, UT (US); Carl Grundstrom, Sandy, UT (US); William Erik Sherwood, Salt Lake City, CA (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 14/308,541

(22) Filed: Jun. 18, 2014

(65) Prior Publication Data

US 2015/0373453 A1 Dec. 24, 2015

(51) Int. Cl.

| | |
|---|---|
| ***H04R 3/00*** | (2006.01) |
| ***G10L 21/0208*** | (2013.01) |
| ***G10L 21/0232*** | (2013.01) |
| ***G10L 21/0216*** | (2013.01) |
| ***G10L 15/20*** | (2006.01) |
| ***G10L 25/78*** | (2013.01) |
| ***G10L 25/84*** | (2013.01) |

(52) U.S. Cl.
CPC ........... *H04R 3/00* (2013.01); *H04R 2410/05* (2013.01); *H04R 2499/11* (2013.01)

(58) Field of Classification Search
CPC . H04R 1/08; H04R 3/00; H04R 3/002; H04R 2499/11; H04R 2410/05; H04R 25/55; H04R 3/005; G10L 21/02; G10L 21/0216; G10L 21/0232; G10L 21/0208; G10L 25/27; G10L 21/02165; G10L 25/84; G10L 25/78; G10L 25/90; G10L 15/20; G10L 2021/02165; G10K 11/00
USPC ............................ 381/71.11, 71.14; 704/226
See application file for complete search history.

(56) References Cited

U.S. PATENT DOCUMENTS 4,658,426 A * 4/1987 Chabries ............ G10L 21/0208 381/71.11
4,897,878 A * 1/1990 Boll ....................... G10L 15/20 704/233

(Continued)

OTHER PUBLICATIONS

United States International Searching Authority; International Search Report & Written Opinion for PCT/US2015/035612; dated Sep. 18, 2015; 9 pages; Alexandria, VA; US.

*Primary Examiner* — Yogeshkumar Patel
(74) *Attorney, Agent, or Firm* — Kirk Dorius; Dorius Law P.C.

(57) ABSTRACT

Techniques for processing audio signals include removing noise from the audio signals or otherwise clarifying the audio signals prior to outputting the audio signals. The disclosed techniques may employ minimum mean squared error (MMSE) analyses on audio signals received from a primary microphone and at least one reference microphone, and to techniques in which the MMSE analyses are used to reduce or eliminate noise from audio signals received by the primary microphone. Optionally, confidence intervals may be assigned to different frequency bands of an audio signal, with each confidence interval corresponding to a likelihood that its respective frequency band includes targeted audio, and each confidence interval representing a contribution of its respective frequency band in a reconstructed audio signal from which noise has been removed.

24 Claims, 3 Drawing Sheets

(56) References Cited

U.S. PATENT DOCUMENTS 5,668,927 A * 9/1997 Chan .................. G10L 21/0208 704/214
5,905,969 A * 5/1999 Mokbel ................ G10L 15/065 704/201
5,924,065 A * 7/1999 Eberman ............ G10L 21/0208 704/222
6,067,513 A * 5/2000 Ishimitsu ............. G10L 15/065 704/226
6,157,909 A * 12/2000 Mauuary ............ G10L 21/0208 704/228
6,757,395 B1 * 6/2004 Fang .................. G10L 21/0208 381/94.3
7,392,181 B2 * 6/2008 Balan ................ G06K 9/00503 704/226
7,440,891 B1 * 10/2008 Shozakai ............... G10L 15/20 704/233
7,933,420 B2 * 4/2011 Copley ............... G10K 11/178 381/71.11
8,175,291 B2 * 5/2012 Chan .................. G10L 21/0208 381/94.7
8,265,263 B2 * 9/2012 Beaucoup ............. H04B 3/234 370/289
9,408,542 B1 * 8/2016 Kinast ............... A61B 5/02125
9,576,583 B1 * 2/2017 Betts .................. G10L 21/0264
9,633,671 B2 * 4/2017 Giacobello ......... G10L 21/0208
9,761,245 B2 * 9/2017 Lamy ................. G10L 21/0232
9,805,738 B2 * 10/2017 Krini ..................... G10L 21/02
2002/0002455 A1 * 1/2002 Accardi ............. G10L 21/0208 704/226
2002/0141601 A1 * 10/2002 Finn ...................... H04R 3/005 381/92
2003/0018471 A1 * 1/2003 Cheng ................ G10L 21/0208 704/233
2003/0040908 A1 * 2/2003 Yang ..................... H04R 3/005 704/233
2003/0063759 A1 * 4/2003 Brennan ............... H04R 3/005 381/92
2004/0040621 A1 * 3/2004 Gotanda ............ G10L 21/0208 141/330
2004/0064307 A1 * 4/2004 Scalart ............... G10L 21/0208 704/205
2004/0125863 A1 * 7/2004 Ghosh ............... H04B 1/71055 375/147
2004/0181399 A1 * 9/2004 Gao ...................... G10L 19/005 704/220
2004/0204922 A1 * 10/2004 Beadle .................. G06K 9/624 702/189
2005/0276423 A1 * 12/2005 Aubauer ............... H04R 3/005 381/92
2006/0053007 A1 * 3/2006 Niemisto ............... G10L 25/78 704/233
2006/0262939 A1 * 11/2006 Buchner ................ H04M 9/08 381/56
2007/0055505 A1 * 3/2007 Doclo ................ G10L 21/0208 704/226
2007/0055508 A1 * 3/2007 Zhao ..................... H04R 25/55 704/226
2008/0059163 A1 * 3/2008 Ding ...................... G10L 15/20 704/226
2008/0219434 A1 * 9/2008 Liu ........................ H04M 9/08 379/406.08
2009/0048824 A1 * 2/2009 Amada .............. G10L 21/0208 704/10
2009/0076814 A1 * 3/2009 Lee ......................... G10L 25/78 704/233
2009/0254340 A1 * 10/2009 Sun .................... G10L 21/0208 704/226
2010/0010808 A1 * 1/2010 Sugiyama .......... G10L 21/0208 704/203
2010/0207689 A1 * 8/2010 Shimada ............ G10L 21/0208 327/551
2010/0246849 A1 * 9/2010 Sudo ........................ H03G 3/32 381/94.1
2011/0170707 A1 * 7/2011 Yamada ................ H04B 15/00 381/94.1
2011/0288858 A1 * 11/2011 Gay ...................... G10L 21/028 704/226
2011/0305345 A1 * 12/2011 Bouchard .......... G10L 21/0208 381/23.1
2012/0076316 A1 * 3/2012 Zhu ........................ H04R 3/005 381/71.11
2012/0140943 A1 * 6/2012 Hendrix ............ G10K 11/1784 381/71.11
2012/0195423 A1 8/2012 Kim
2012/0290296 A1 * 11/2012 Sugiyama .......... G10L 21/0208 704/226
2012/0308024 A1 * 12/2012 Alderson ............ G10K 11/178 381/71.11
2012/0330652 A1 * 12/2012 Turnbull ................ G10L 21/02 704/226
2013/0003987 A1 * 1/2013 Furuta ................ G10L 21/0208 381/94.3
2013/0064392 A1 * 3/2013 Sugiyama .......... G10L 21/0208 381/94.1
2013/0094657 A1 * 4/2013 Brammer ............ G10K 11/178 381/71.6
2013/0142349 A1 * 6/2013 Liu ...................... G10K 11/002 381/71.11
2013/0163781 A1 * 6/2013 Thyssen ................ H04R 3/007 381/94.3
2013/0238324 A1 * 9/2013 Ichikawa ............... G10L 15/20 704/226
2013/0294614 A1 * 11/2013 Bharitkar ............. H04M 9/082 381/71.1
2013/0343558 A1 * 12/2013 Fox ........................ H04R 3/002 381/71.14
2014/0177868 A1 * 6/2014 Jensen .................. H04R 3/002 381/94.7
2014/0254816 A1 * 9/2014 Kim ....................... G10K 11/16 381/71.11
2015/0071454 A1 * 3/2015 Sunohara ............ H04R 25/453 381/71.11
2015/0127329 A1 * 5/2015 Lamy ................. G10L 21/0208 704/226
2015/0127330 A1 * 5/2015 Lamy ................. G10L 21/0216 704/226
2015/0163604 A1 * 6/2015 Fruhauf ............ A61N 1/36032 607/57
2015/0172814 A1 * 6/2015 Usher .................... H04R 3/005 381/92
2015/0256953 A1 * 9/2015 Kwatra .................... H04R 5/04 381/58
2015/0256956 A1 * 9/2015 Jensen .................. H04R 25/30 381/56
2015/0365761 A1 * 12/2015 Alderson .......... G10K 11/1784 381/71.6
2016/0125866 A1 * 5/2016 Park .................... G10K 11/178 381/71.11
2016/0240210 A1 * 8/2016 Lou .................... G10L 21/0232
2017/0077945 A1 * 3/2017 Pagnanelli .......... H03M 1/1038

* cited by examiner

MULTI-AURAL MMSE ANALYSIS TECHNIQUES FOR CLARIFYING AUDIO SIGNALS

TECHNICAL FIELD

This disclosure relates generally to techniques for processing audio signals, including techniques for removing noise from audio signals or otherwise clarifying the audio signals prior to outputting the audio signals. More specifically, this disclosure relates to techniques in which minimum mean squared error (MMSE) analyses are conducted on audio signals received from a primary microphone and at least one reference microphone, and to techniques in which the MMSE analyses are used to reduce or eliminate noise from audio signals received by the primary microphone.

SUMMARY

In various aspects, a method according to this disclosure is a clarification process that includes identifying a targeted portion, or component, of an audio signal and reducing or eliminating noise that accompanies the targeted portion of the audio signal. When the clarification process is used, the targeted portion of the primary audio signal, or at least a significant portion of the targeted portion of the primary audio signal, will remain after, or survive, the clarification process. Each portion of the primary audio signal that remains following the clarification process is referred to herein as a "clarified audio signal." In embodiments where different frequency bands of the primary audio signal are separately clarified, the clarified audio signals may be included in a reconstructed version of the primary audio signal, which is also referred to herein as a "reconstructed audio signal." In embodiments where the clarification process is used with an audio communication device, such as a mobile telephone, the targeted portion of the primary audio signal may comprise an individual's voice. Once a primary audio signal has been clarified and the clarified audio signal has optionally been included in a reconstructed audio signal, the clarified and/or reconstructed audio signal may be stored, transmitted to another device and/or audibly output.

A method for processing an audio signal includes receiving the audio signal, in the form of sound, with at least two microphones in proximity to one another, but providing different orientations or perspectives and, therefore, receiving the audio signal in different ways from one another, or from different perspectives. Such an arrangement is referred to as a "binaural environment." The microphones include a primary microphone and one or more reference microphones. The primary microphone may be positioned to receive an audio signal from an intended source; for example, the primary microphone may comprise a microphone of a mobile telephone into which an individual speaks while using the mobile telephone. The audio signal from the intended source may comprise targeted audio, or targeted sound. Because of its orientation or perspective, the audio signal received by the primary microphone is referred to herein as a "primary audio signal."

Each reference microphone may be positioned somewhat remotely from the intended source of sound, at a location and orientation, or perspective, that enable the reference microphone to receive background sound to the same extent or to a greater extent than the background sound is received by the primary microphone, and to receive targeted audio to a lesser extent than the primary microphone receives targeted audio. The audio signal received from the perspective of each reference microphone is referred to herein as a "reference audio signal."

Once an audio signal has been received as a primary audio signal and one or more reference audio signals, the primary audio signal may be clarified. As part of the clarification process, the primary audio signal and each reference audio signal may be subjected to one or more adaptive time domain filters. In a specific embodiment, the primary audio signal and/or each reference audio signal may be subjected to a least mean squares (LMS) filter.

Regardless of whether or not the primary audio signal or any reference audio signal is subjected to one or more adaptive time domain filters, a noise estimate is obtained. The noise estimate may be obtained from one or more reference audio signals. More specifically, the noise estimate may be obtained from one or more frequency bands in which one or more parts of at least one targeted audio (e.g., formants, or the spectral peaks of the human voice; etc.) are known to be present. The noise estimate may be obtained from the reference audio signal(s) alone, or by comparing appropriate portions (e.g., each frequency band of interest, etc.) of the reference audio signal(s) to corresponding portions of the primary audio signal, which, in addition to noise, will include the target audio. Even more specifically, a sample of a particular frequency band of the primary audio signal may be compared with a simultaneously obtained sample of the same particular frequency band of one or more reference audio signals to identify suspected, or likely, noise present in that frequency band of the primary audio signal (i.e., a noise estimate). Regardless of how it is obtained, each noise estimate may be used to identify suspected noise, or likely noise, present in the primary audio signal or in one or more frequency bands of the primary audio signal. By analyzing audio signals in a binaural environment, noise estimation may be conducted without a voice activity detector, as is required when noise is estimated without the use of a reference audio signal.

Each noise estimate may be considered while conducting a minimum mean square error (MMSE) analysis on the primary audio signal or on one or more frequency bands of the primary audio signal. The MMSE analysis may be used to minimize error, defined by a function of noise estimates and the frequency decomposition of the primary audio signals. The result of that minimization may be used to modify one or more frequency bands of the primary audio signal. In some embodiments, the MMSE analysis may be tailored based on one or more noise estimates. Alternatively, one or more noise estimates may be accounted for or incorporated into the MMSE analysis of the primary audio signal or one or more frequency bands of the primary audio signal. The MMSE analysis at least partially eliminates the noise from the primary audio signal or from one or more frequency bands of the primary audio signal, providing one or more clarified audio signals. Stated another way, the overall presence of noise in one or more frequency bands of the clarified audio signal(s) may be reduced, or, in the case of each frequency band that includes noise but lacks targeted audio, the overall presence of the frequency band in the reconstructed output signal may be reduced.

In some embodiments, including those where a primary audio signal has been separated into a plurality of different frequency bands, as well as those where an MMSE analysis performed on different frequency bands has resulted in a plurality of clarified audio signals, with each clarified audio signal corresponding to a frequency band of the plurality of frequency bands, a confidence interval may be assigned to each frequency band or clarified audio signal. The confidence level for each frequency band, or clarified audio signal, may correspond to the degree to which that frequency band, or clarified audio signal, will be included in a reconstructed audio signal. Each confidence interval may be based on real-time analysis and/or, in some embodiments, on historical data. More specifically, the confidence interval for each frequency band or clarified audio signal may correspond to information gleaned from the primary audio signal and each reference audio signal (e.g., a noise estimate for the corresponding frequency band, results of the MMSE analysis on the corresponding frequency band, etc.).

The confidence interval may at least partially correspond to a likelihood that its corresponding frequency band or clarified audio signal includes at least a portion of the targeted audio of the primary audio signal, such as a human voice, music, or the like. In some embodiments, the confidence interval for a particular frequency band or clarified audio signal may correspond to the likelihood that the frequency band or clarified audio signal includes at least a portion of the targeted audio. Alternatively, or in addition, the confidence interval for a particular frequency band or clarified audio signal may correspond to an amount of noise (e.g., a percentage of noise, etc.) removed from the clarified audio signal when compared with the noise present in the corresponding frequency band of a corresponding portion of a reference audio signal.

Each confidence interval may be embodied as a gain value; e.g., a value between zero (0) and one (1), which may be used as a multiplier for its corresponding predetermined frequency band and, thus, to control the extent to which that corresponding predetermined frequency band is included in the reconstructed output audio signal. As an example, if there is a high level of confidence that a frequency band or a clarified audio signal corresponds to a portion of the targeted audio of the primary audio signal (e.g., from the MMSE analysis on that frequency band, etc.), a relatively high gain value (e.g., greater than 0.5, between 0.6 and 1, etc.) may be assigned to that frequency band. If a frequency band is less likely to correspond to a portion of the target audio of the primary audio signal, the corresponding confidence interval may be low, and a correspondingly low gain value (e.g., a gain value of 0.5 or less, etc.) may be assigned to that particular frequency band. If there is a very low level of confidence that a frequency band corresponds to a portion of the targeted audio, or that the frequency band is very likely to be primarily made up of noise, a very low gain value (e.g., less than 0.3, etc.) may be assigned to that particular frequency band.

When a plurality of frequency bands have been separated, or extracted, from a primary audio signal and a confidence interval has been assigned to each frequency band, the confidence intervals may then be used to determine the extent to which each of the frequency bands will be included in a reconstructed audio signal; i.e., the presence of each frequency band of the reconstructed audio output signal may correspond to its confidence interval. More specifically, each confidence interval may be used to dynamically adjust a magnitude of its corresponding frequency band to improve signal-to-noise ratio (SNR) of the resulting reconstructed signal. Frequency bands with higher confidence intervals will have a greater presence than frequency bands with lower confidence intervals, making the frequency bands with high confidence intervals more pronounced in the reconstructed audio signal than the frequency bands with low confidence intervals. Once confidence intervals have been assigned, the frequency bands may be recompiled to generate the reconstructed audio signal.

The disclosed clarification process may be conducted on a continuous or substantially continuous basis (e.g., in a series of time segments, etc.).

Any embodiment of a clarification process according to this disclosure may be embodied as a program (e.g., a software application, or "app"; firmware; etc.) that controls operation of a processing element of an electronic device. Accordingly, an electronic device of this disclosure may be configured to provide a clarified audio signal and/or a reconstructed audio signal with little or no noise, regardless of the degree to which noise was present in a source audio signal. The electronic device may then be configured to store, transmit and/or provide an audible output of the clarified audio signal and/or the reconstructed audio signal.

In a specific, but non-limiting embodiment, such an electronic device may comprise a mobile telephone or other audio communication device. In addition to including the program and a processor, the audio communication device may include a primary microphone and one or more reference microphones. The audio communication device may also include a transmission element, such as an antenna that transmits an audio signal. The primary microphone and each reference microphone are configured to receive an audio signal and to communicate the audio signal to the processor. The processor processes a primary audio signal from the primary microphone and a reference audio signal from each reference microphone in accordance with an embodiment of an above-described method, and generates a clarified audio signal and/or a reconstructed audio signal. The clarified audio signal and/or the reconstructed audio signal may then be transmitted by the output element of the audio communication device; for example, to a cellular carrier network, from which the clarified audio signal and/or the reconstructed audio signal may be ultimately received by a recipient device, such as another telephone.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

Figure 1:
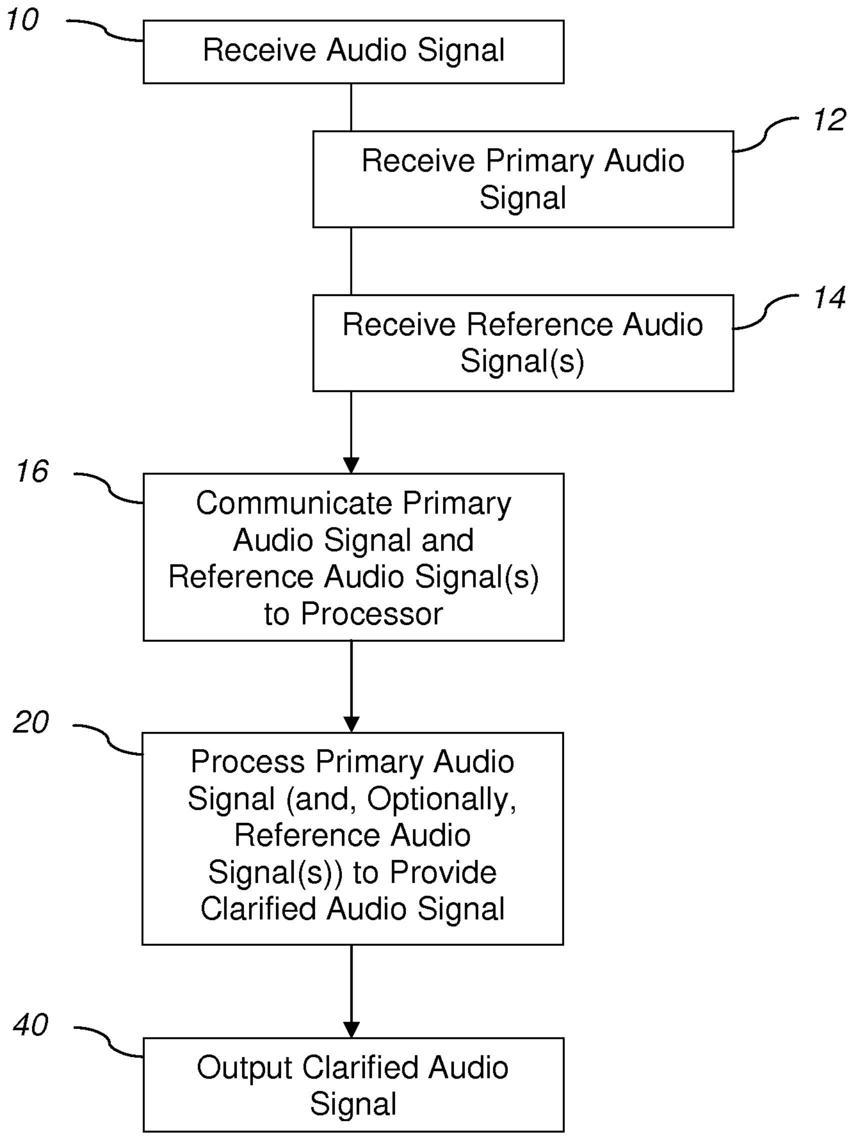
FIG. 1 is a flow chart showing an embodiment of a method for clarifying audio signals.

With reference to FIG. 1, an embodiment of a method for clarifying an audio signal is illustrated and described. In general, the method includes three components: receiving an audio signal, at reference 10; processing the audio signal, at reference 20, to provide a clarified audio signal and/or a reconstructed audio signal; and outputting the clarified audio signal and/or the reconstructed audio signal, at reference 40.

Figure 3:
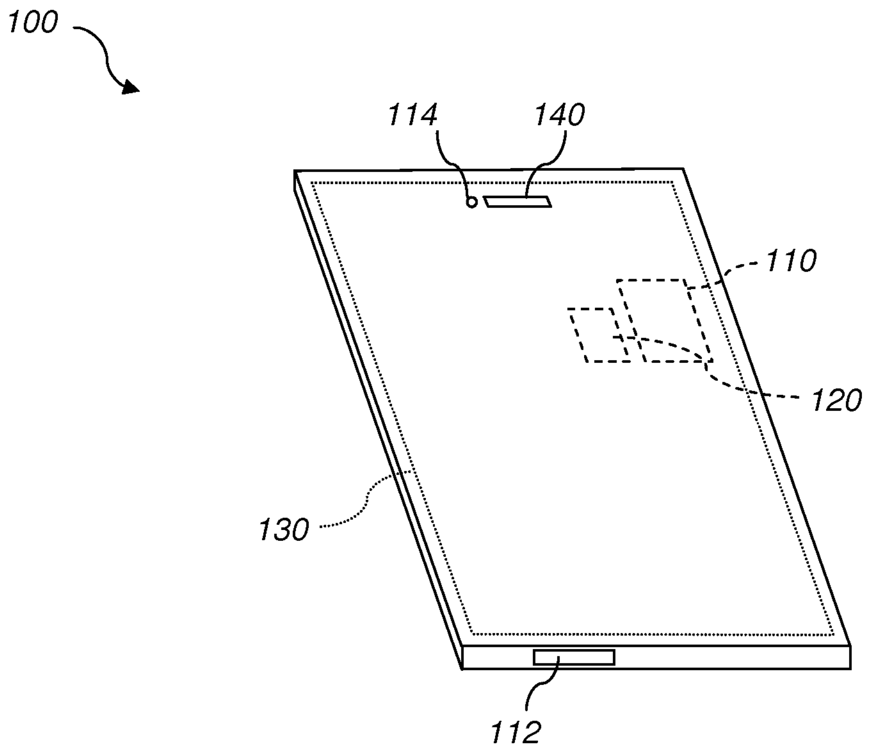
FIG. 3 schematically depicts an embodiment of an electronic device configured to execute an embodiment of a method for clarifying audio signals in accordance with teachings of this disclosure.

The act of receiving an audio signal, at reference 10, may include receiving a plurality of audio signals. At reference 12, a primary audio signal may be received from a first source, such as a primary microphone 112 of a mobile telephone or other audio communication device 100, as shown in FIG. 3. At reference 14 of FIG. 1, one or more reference microphones 114 of the audio communication device 100 may receive a reference audio signal. The primary microphone 112 and each reference microphone 114 may respectively receive the primary audio signal and each reference audio signal simultaneously and in phase. In some embodiments, the components of the primary audio signal and each reference audio signal may be substantially the same, but in different amounts, due to an intraaural level difference (ILD) between the different orientations, or perspectives, of the respective primary microphone 112 and reference microphone(s) 114 by which the primary audio signal and the reference audio signal(s) were obtained.

Upon receiving the primary audio signal and each reference audio signal, the primary microphone 112 and each reference microphone 114 of the audio communication device 100 shown in FIG. 3 may, at reference 16 of FIG. 1, communicate these signals to a processor 120 of the audio communication device 100.

At reference 20 of FIG. 1, the primary audio signal and each reference audio signal may be processed in a manner that will provide a clarified audio signal. This clarification process may include a number of acts, which are set forth in detail in FIG. 2. At reference 22 of FIG. 2, the primary audio signal and, optionally, each reference audio signal, may be subjected to one or more adaptive time domain filters. Such a filter, which may comprise a low pass filter, may remove error, or likely noise, from the filtered signals, resulting in a more refined signal, or a clearer signal, following further processing. In a specific embodiment, a least mean squares filter (LMS) may be used as the adaptive time domain filter. The adaptive time domain filter may provide a rough, or passive, filter that removes some noise and/or other undesired artifacts from each filtered signal.

Figure 2:
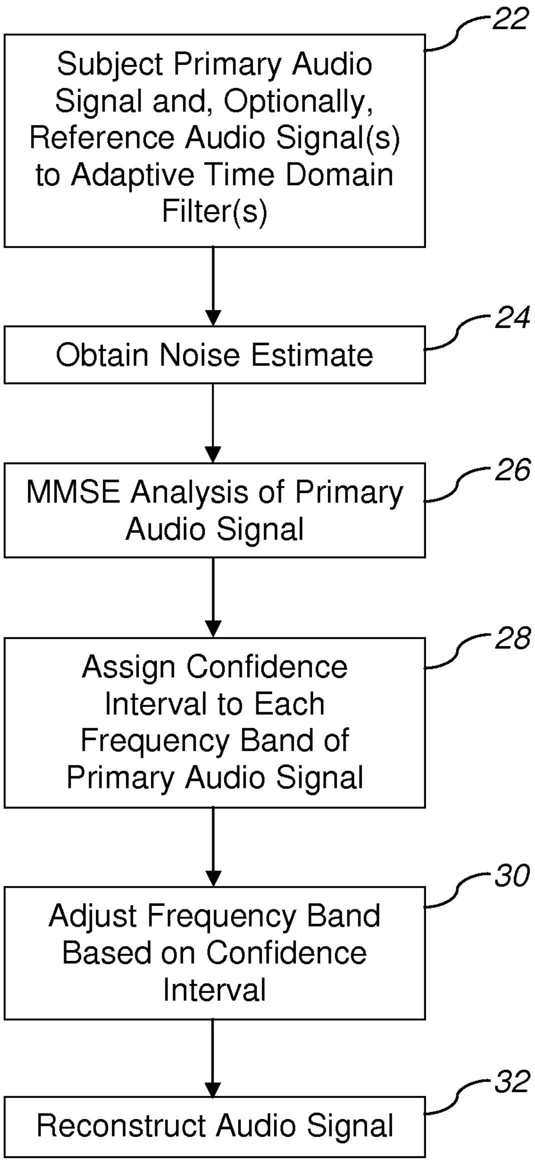
FIG. 2 is a flow chart illustrating an embodiment of use of adaptive least mean squares (LMS) filtering in an embodiment of a method for clarifying audio signals in accordance with teachings of this disclosure.

At reference 24 of FIG. 2, a noise estimate may be obtained. More specifically, the reference audio signal or, in embodiments where a plurality of reference audio signals are received, the reference audio signals may be processed in a manner that provides a noise estimate. Such processing may include evaluation of one or more frequency bands that likely include target audio, such as a formant making up part of the voice of an individual speaking into the primary microphone 112 of the audio communication device 100 (FIG. 3). The noise estimate provided by such processing may be based solely upon audio signals from each evaluated frequency band of each reference audio signal. Alternatively, the noise estimate may be based on differences between each evaluated frequency band of each reference audio signal and each corresponding frequency band of a primary audio signal that corresponds to the reference audio signal(s). In a specific embodiment, if a particular frequency band from a reference audio signal has substantially the same power or greater power than the same frequency band of a corresponding primary audio signal, that frequency band is most likely to be made up primarily of noise and, therefore, may be considered to be made up primarily of noise. If a frequency band from the primary audio signal has a greater power than the same frequency band in a corresponding reference audio signal, it is likely to include at least a portion of the targeted audio and may, therefore, be considered to include at least a portion of the targeted audio.

Once a noise estimate has been obtained, the noise estimate may be used in conjunction with a minimum mean square error (MMSE) analysis of the primary audio signal, as set forth at reference 26 of FIG. 2. In some embodiments, the MMSE analysis may account for the noise estimate. More specifically, the MMSE analysis may be tailored based on the noise estimate. For example, the noise estimate may be incorporated into the MMSE analysis. The MMSE analysis may then be applied to the primary audio signal in a manner know in the art to provide at least one clarified audio signal. In embodiments where the primary audio signal has been subjected to an adaptive time domain filter, the spectral characteristics of the primary audio signal have been modified, and the MMSE analysis may be modified accordingly. In some embodiments, the MMSE analysis may be separately applied to different frequency bands of the primary audio signal to provide a plurality of clarified audio signals, each corresponding to one of the frequency bands of the primary audio signal.

At reference 28 of FIG. 2, a confidence interval may be assigned to each frequency band of the primary audio signal. Confidence intervals may be applied to unprocessed frequency bands of a primary audio signal, to filtered frequency bands of the primary audio signal or to clarified audio signals resulting from MMSE analyses on the frequency bands of the primary audio signal. Each confidence interval may provide an indicator of the likelihood that a corresponding frequency band of the primary audio signal corresponds to at least a portion of the targeted audio. In some embodiments, the primary audio signal and each reference audio signal, or information obtained from either or both of those signals (e.g., the noise estimate for each frequency band, the results of the MMSE analysis on each frequency band, etc.) may be considered while assigning the confidence interval to each frequency band of the primary audio signal.

Each confidence interval may control the extent to which a corresponding predetermined frequency band is included in the reconstructed output audio signal. The practical effect of each confidence interval is to attenuate frequency bands that are not believed to contribute to the targeted audio. The confidence interval for a particular, predetermined frequency band may be applied to that predetermined frequency band in any suitable manner. Without limitation, the confidence interval may comprise a multiplier for its corresponding predetermined frequency band. In a specific embodiment, each confidence interval may be embodied as a gain value; i.e., a value between zero (0) and one (1). For example, if a particular frequency band is likely to a portion of the targeted audio of the primary audio signal, a relatively high gain value (e.g., greater than 0.5, between 0.6 and 1, etc.) may be assigned to that frequency band. If a particular frequency band is at least as likely to include noise as the likelihood that it includes a portion of the targeted audio, the confidence interval for that frequency band may be low, and a correspondingly low gain value (e.g., a gain value of 0.5 or less, etc.) may be assigned to that frequency band. If it is unlikely that a particular frequency band includes a portion of the targeted audio, or that the particular frequency band is very likely to be the result of noise, a very low confidence interval and a very low gain value (e.g., less than 0.3, etc.) may be assigned to that frequency band.

With an appropriate confidence interval assigned to each frequency band of the primary audio signal, that frequency band may be adjusted in an appropriate manner, at reference 30 of FIG. 2. In embodiments where the confidence interval corresponds to a gain value, the gain value may be applied to the frequency band.

At reference 32 of FIG. 2, a reconstructed audio signal may be constructed by combining one or more frequency bands that have been modified. The frequency bands that are combined may be modified by the above-described MMSE analysis, using a confidence interval, or by a combination of MMSE analysis and confidence intervals.

The reconstructed audio signal may then be output at reference 40 of FIG. 1. In embodiments where a process of the type that has been described in reference to FIGS. 1 and 2 is used to modify audio that has been received by a primary microphone and one or more reference microphones of an audio communication device 100, such as the mobile telephone depicted by FIG. 3, the modified primary audio signal may be communicated by a processor 110 of the audio communication device 100 to an antenna 130 of the audio communication device 100, which then transmits the modified primary audio signal to another audio communication device or to a network, which may then transmit the modified primary audio signal to another audio communication device. The audio communication device that receives the modified primary audio signal may then process that signal in a manner that provides an audible output with little or no noise.

While the preceding disclosure has been provided primarily in the context of audio communication devices, the disclosed subject matter may be applied to audio signals in a variety of other contexts as well. Without limitation, the disclosed subject matter may be useful with apparatuses that are used to receive and amplify sound (e.g., systems that include microphones, amplifiers and, optionally, mixers, etc.), with apparatuses that receive and record audio (e.g., voice recorders, video recorders, sound studios, etc.), with audio headsets (e.g., wired, wireless (e.g., BLUETOOTH®, etc.), etc.) and in a variety of other contexts. More specifically, as illustrated by FIG. 3, the reconstructed audio signal may be stored by memory 120 associated with the processor 110 of an electronic device, such as the audio output device 100 or another device that is configured to receive and store audio (e.g., a voice recorder, an audio recorder, a video camera, etc.). Alternatively, the reconstructed audio signal may be audibly output by a speaker 140 of an electronic device, such as a loud speaker of a stereo, a portable electronic device, a computer, a sound system or the like.

In embodiments where the primary audio signal comprises a signal that is obtained (e.g., by a primary microphone 112 of an audio communication device 100—FIG. 3) and stored (e.g., by memory 120 associated with a processor 110 of the audio communication device 100, etc.), transmitted (e.g., by the antenna 130 of the audio communication device 100, etc.) or output (e.g., by a speaker 140 of the audio communication device 100, etc.) in real-time or substantially in real-time, the processes that have been described in reference to FIGS. 1 and 2 may be conducted repeatedly.

Repetition of the clarification process(es) may provide for continuous modification of the primary audio signal, and for quick adjustments that account for changes in the relative levels of noise and targeted audio in the primary audio signal.

Although the foregoing disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A method for clarifying an audio signal comprising:

receiving a primary audio signal and a reference audio signal, each audio signal including a plurality of frequency bands, an unknown target component, and an unknown noise component;

determining a noise estimate of the unknown noise component from the reference audio signal;

incorporating the noise estimate into a minimum mean squared error analysis;

subjecting each frequency band of the plurality of frequency bands of the primary audio signal to the minimum mean squared error analysis;

assigning a confidence interval as a measure of statistical likelihood of dominance of the unknown target component in each frequency band of the plurality of frequency bands based on a result of the minimum mean squared analysis;

modifying an audio output level of each frequency band of the primary audio signal based on the confidence interval of that frequency band to provide a modified output frequency band; and combining the modified output frequency bands for each frequency band of the plurality of frequency bands of the primary audio signal to provide a clarified output audio signal substantially reduced in the unknown noise component.

2. The method of claim 1, wherein the determining the noise estimate includes comparing at least one frequency band from the primary audio signal with at least one corresponding frequency band of the reference audio signal.

3. A method for clarifying an audio signal comprising:

The method of claim 2, wherein determining the noise estimate includes comparing the plurality of frequency bands of the primary audio signal with the corresponding plurality of frequency bands of the reference audio signal.

4. The method of claim 1, further comprising:

subjecting each frequency band of the plurality of frequency bands of the reference audio signal to the minimum mean squared error analysis.

5. The method of claim 1, wherein assigning the confidence interval indicative of the statistical likelihood of presence of the unknown target component includes:

assigning a very low confidence interval to a frequency band of the reference audio signal having a greater power than a corresponding frequency band of the primary audio signal;

assigning a low confidence interval to a frequency band of the reference audio signal having substantially the same power as a corresponding frequency band of the primary audio signal; and assigning a high confidence interval to a frequency band of the primary audio signal having a greater power than a corresponding frequency band of the reference audio signal.

6. The method of claim 5, wherein assigning the very low confidence interval comprises assigning a gain of less than 0.3 to the frequency band.

7. The method of claim 5, wherein assigning the low confidence interval comprises assigning a gain of about 0.5 or less to the frequency band.

8. The method of claim 5, wherein assigning the high confidence interval comprises assigning a gain of greater than 0.6 to the frequency band.

9. The method of claim 1, wherein assigning the confidence interval comprises assigning an appropriate gain to each frequency band.

10. The method of claim 1, wherein assigning the confidence interval comprises dynamically estimating noise in the audio signals.

11. The method of claim 1, conducted without detecting voice activity.

12. The method of claim 1, further comprising:

subjecting the primary audio signal and the reference audio signal to an adaptive time domain filter.

13. The method of claim 12, wherein subjecting the primary audio signal and the reference audio signal to the adaptive time domain filter comprises subjecting the primary audio signal and the reference audio signal to a least mean square filter.

14. The method of claim 12, wherein subjecting the primary audio signal and the reference audio signal to the adaptive time domain filter comprises subjecting the primary audio signal and the reference audio signal to the adaptive time domain filter before subjecting each frequency band of the pluralities of frequency bands of the primary and the reference audio signals to the minimum mean squared error analyses.

15. A method for clarifying an audio signal comprising:

receiving a primary audio signal and a reference audio signal, each audio signal including a plurality of frequency bands, an unknown target component, and an unknown noise component;

subjecting the primary audio signal to an adaptive time domain filter to provide a filtered audio signal;

determining a noise estimate of the unknown noise component using the reference audio signal;

tailoring a minimum mean squared error analysis based on the noise estimate; and subjecting each frequency band of the plurality of frequency bands of the filtered audio signal to the minimum mean squared error analysis;

assigning a confidence interval as a measure of statistical likelihood of dominance of the unknown target component in to each frequency band of the plurality of frequency bands of the filtered audio signal based on a result of the minimum mean squared analyses;

modifying an audio output level of each frequency band of the filtered audio signal based on the confidence interval of that frequency band to provide a modified output frequency band; and combining the modified output frequency bands for each frequency band of the plurality of frequency bands of the filtered audio signal to provide a clarified output audio signal substantially reduced in the unknown noise component.

16. An electronic device configured to receive audio signals, comprising:

a primary audio channel for receiving a primary audio signal;

a reference audio channel for receiving a reference audio signal;

a processor programmed to:

receive the primary audio signal from the primary audio channel and the reference audio signal from the reference audio channel;

process the reference audio signal to provide a noise estimate of an unknown noise component;

generate a minimum mean squared error analysis that accounts for the noise estimate of the unknown noise component;

subject a plurality of frequency bands of the primary audio signal to the minimum mean squared error analysis;

compare a result of the minimum mean squared analysis of each frequency band of the plurality of frequency bands of the primary audio signal to a result of the minimum mean squared analysis of a corresponding frequency band of the plurality of frequency bands of the reference audio signal to provide a frequency band comparison;

assign a confidence interval as a measure of statistical likelihood of dominance of an unknown target component relative to the unknown noise component for each frequency band of the plurality of frequency bands of the primary audio signal based on the frequency band comparison that corresponds to that frequency band;

adjust an output power of the frequency band based on the confidence interval to provide a modified output frequency band; and combine the modified output frequency bands for each frequency band of the plurality of frequency bands of the primary audio signal to provide a clarified output audio signal substantially reduced in the unknown noise component; and cause an output element to output the clarified output audio signal; and wherein the output element is in communication with the processor.

17. The electronic device of claim 16, wherein the processor is further programmed to:

subject a plurality of frequency bands of the reference audio signal to the minimum mean squared error analysis, frequency ranges of the plurality of frequency bands of the primary audio signal and of the plurality of frequency bands of the reference audio signal corresponding to one another.

18. The electronic device of claim 16, comprising a mobile telephone.

19. The electronic device of claim 16, wherein the output element comprises a speaker.

20. The electronic device of claim 16, wherein the speaker is carried by the electronic device.

21. The electronic device of claim 16, wherein the speaker is configured to selectively couple to the electronic device.

22. The electronic device of claim 16, wherein the processor is further programmed to:

apply an adaptive time domain filter to the primary audio signal and to the reference audio signal.

23. The electronic device of claim 22, wherein the processor is programmed to:

apply an adaptive least mean square filter to the primary audio signal and to the reference audio signal.

24. The electronic device of claim 22, wherein the processor is programmed to:

apply the adaptive time domain filter to the primary audio signal and to the reference audio signal before subjecting the plurality of frequency bands of the primary audio signal and the plurality of frequency bands of the reference audio signal to the minimum mean squared error analyses.

* * * * *